June 30, 1931. A. A. HODGKINS 1,811,932
PNEUMATIC GEAR SHIFT LOCK
Filed May 9, 1928  3 Sheets-Sheet 3
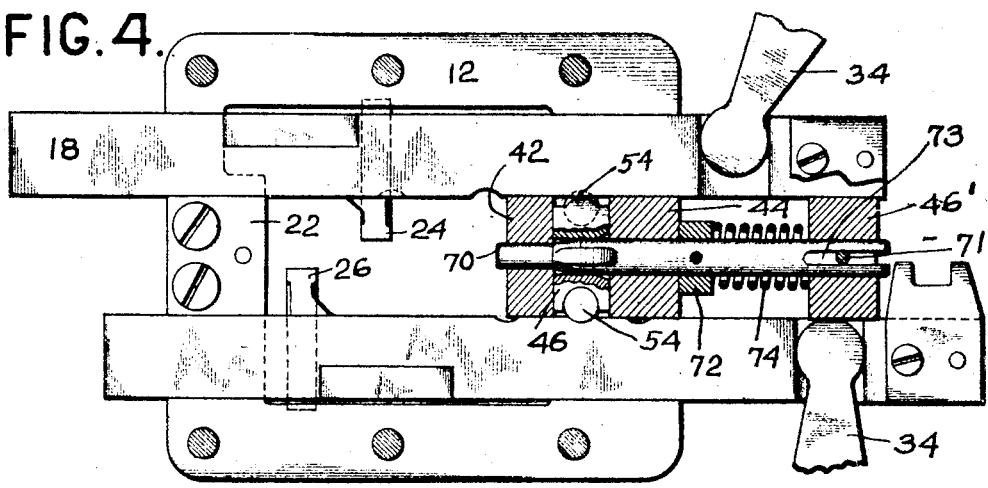
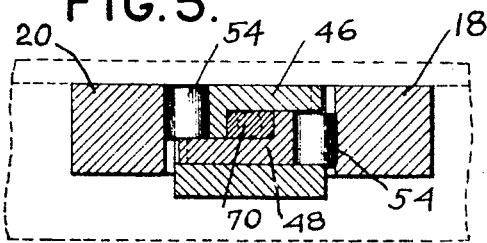
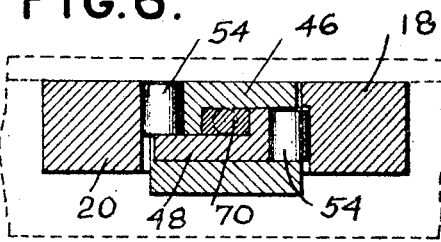
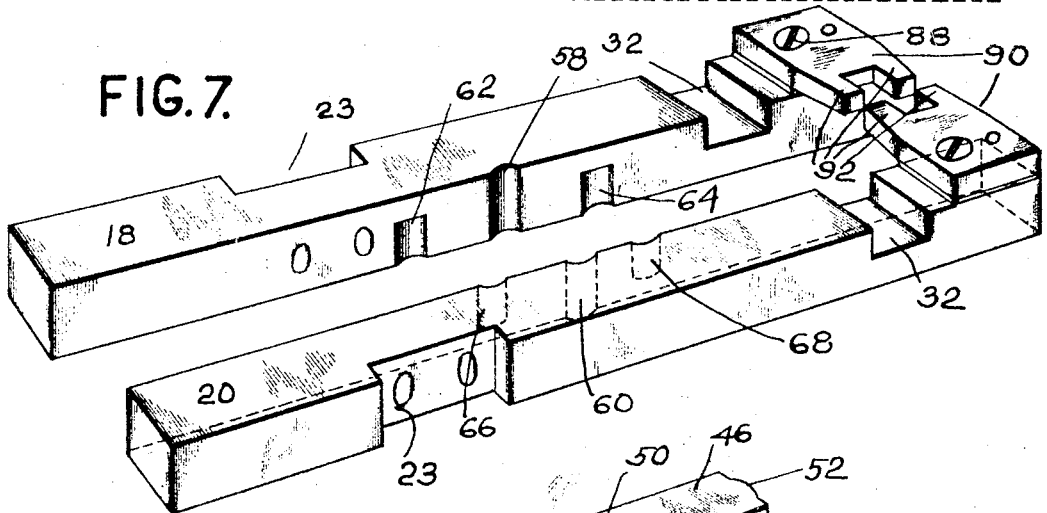
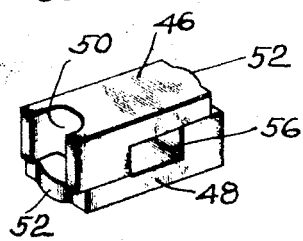
Inventor
Albert A. Hodgkins
By his Attorneys
Hoguet & Heary Patented June 30, 1931

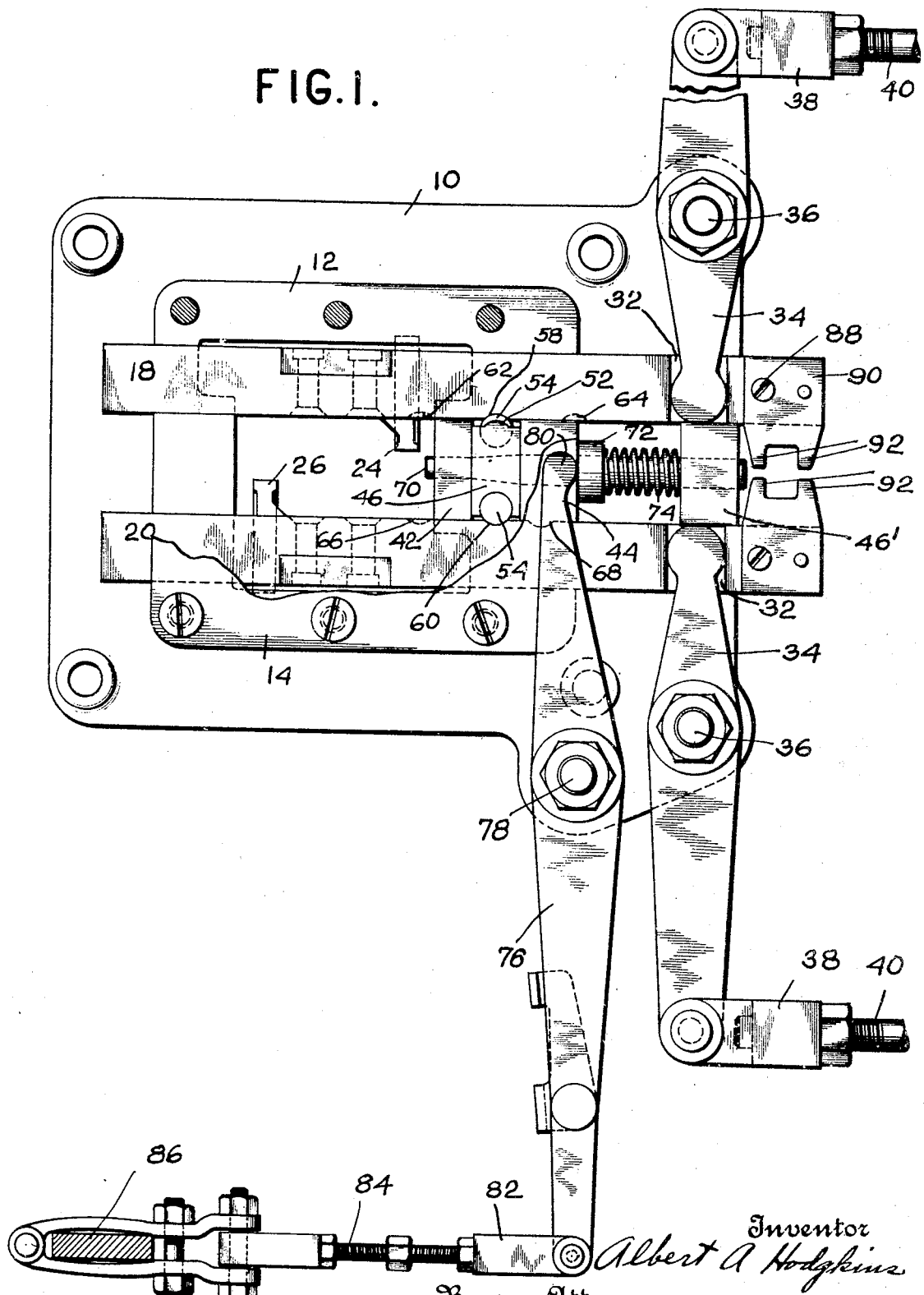

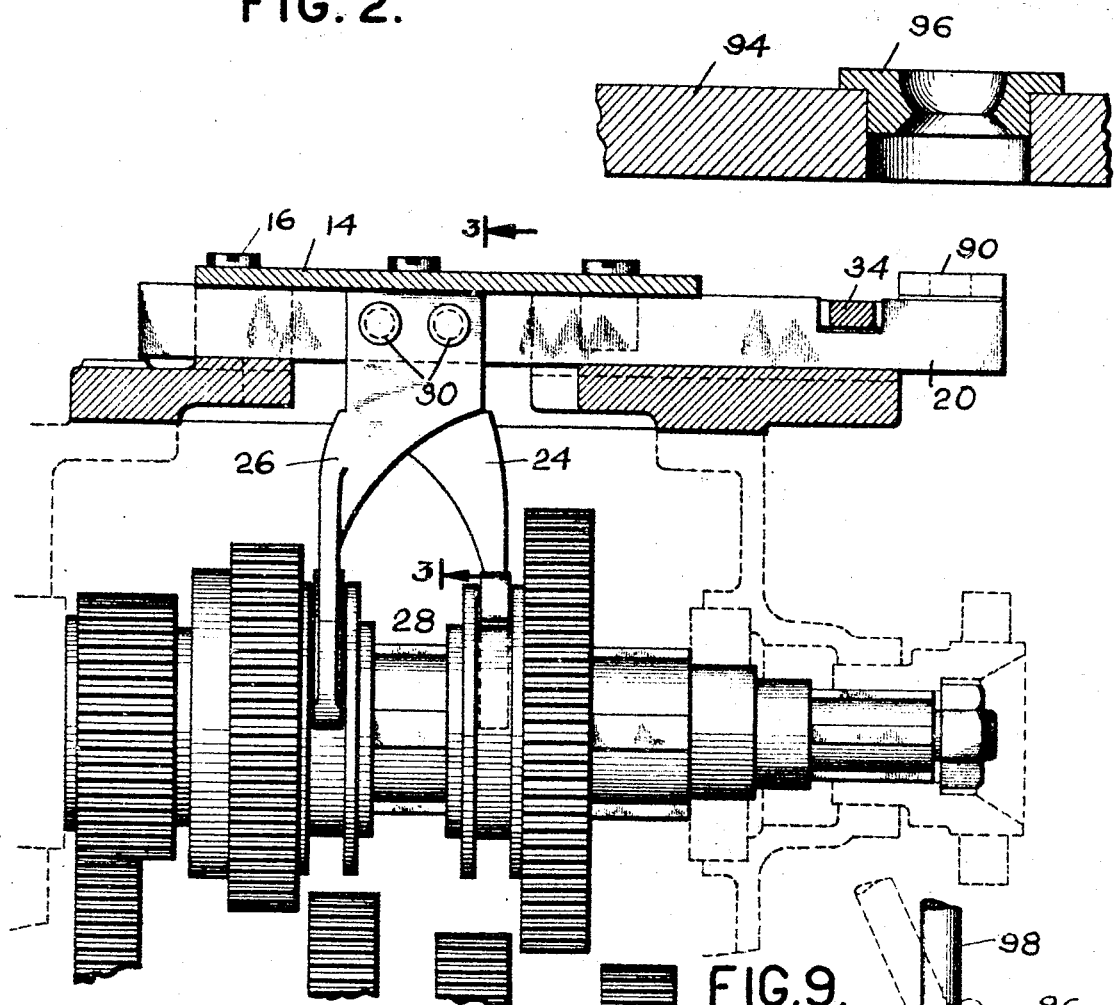
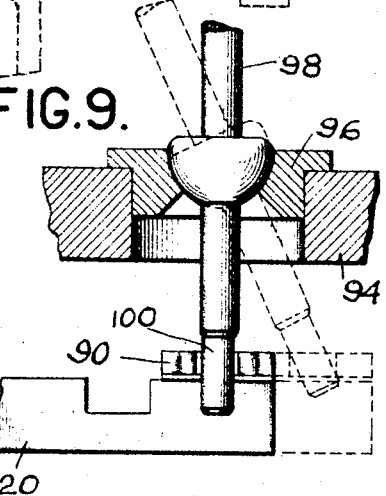
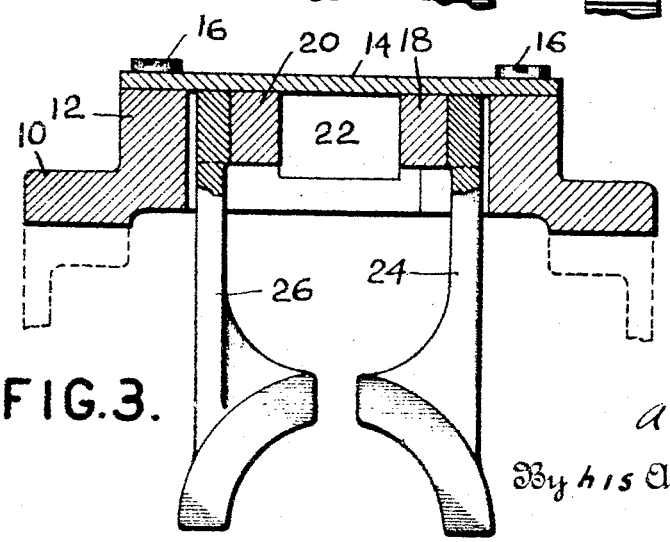

1,811,932

UNITED STATES PATENT OFFICE

ALBERT A. HODGKINS, OF LEONIA, NEW JERSEY, ASSIGNOR TO UNIVERSAL GEAR SHIFT CORPORATION, OF NEW YORK, N. Y., A CORPORATION OF DELAWARE

PNEUMATIC GEAR SHIFT LOCK

Application filed May 9, 1928. Serial No. 276,227.

This invention relates generally to improvements in pneumatic gear shifts, and relates more particularly to an improved interlock for the slip rods of a pneumatic gear shift apparatus.

It is an object of this invention to provide an automatic drift lock, of such a character that, when the gears are in neutral position, a shift to any desired gear may be made, but, if any gear is in mesh with the drive mechanism, further shifting is impossible until the system has been restorted to neutral position.

It is a further object to provide a lock, acting independently of the drift lock but whose mechanism is an integral portion thereof, which shall lock the gears securely in any position to which they may be set, and which lock shall be operative so long as the clutch of the automobile is engaged, and which shall be automatically released when the clutch is disengaged, permitting, in the latter instance any desired rearrangement of the gear setting.

A particular object of this invention is to combine in a single, compact and unitary structure the two locks above mentioned, utilizing parts of one mechanism as mechanical components of the other, while maintaining the action of the two locks completely independent of one another.

A still further object is to provide a mechanism whereby the slip rods may be manually operated should the pneumatic mechanism for some reason fail to operate.

These and other objects will appear as the description proceeds. Reference is to be had to the accompanying drawings, in which similar reference characters represent similar parts in all views, and in which;

Fig. 1 is a plan view of a pneumatic gear shifting mechanism, to the slip rods of which my combination lock has been applied.

Fig. 2 is a side elevation partly in section showing somewhat conventionally the gears of a motor and the manner of mounting the slip rods to shift the gears.

Fig. 3 is a vertical section taken on lines 3—3 of Fig. 2, looking in the direction of the arrows.

Fig. 4 is a plan view, partially in section of the shifting mechanism with my lock applied thereto.

Fig. 5 is a vertical cross section through the lock and slip rods as they appear when the gears are in neutral position.

Fig. 6 is a similar section taken when one of the gears is in mesh.

Fig. 7 is a perspective view of the slip rods, constructed to accommodate my lock.

Fig. 8 is a perspective view of my combination lock with the dagger and the rolls removed.

Fig. 9 shows the means for manually shifting the gears of a pneumatically controlled gearshift.

Referring particularly to Figs. 1 and 2, 10 represents a base plate on which the shifting mechanism is mounted. This plate in plan view comprises a rectangle with a hollow center. It is adapted to be mounted on the top of the gear housing. Flanges, 12, 12 project a short distance upwardly along two edges of the hollow center. A cover plate 14 extends across these flanges, as shown best in Fig. 3, fastened to said flanges by bolts 16, 16. In the space thus defined are located two slip rods, 18 and 20, which are spaced apart by a fixed block 22. The disposition of the slip rods in the rectangular grooves thus provided is best shown in Fig. 4, and when the structure therein depicted is covered by plate 14 (Fig. 3) it can be seen that slip rods 18 and 20 will be free to slide endwise but will be prevented from lateral or vertical movement.

In the outer edge of each slip rod is a rectangular groove 23, (Fig. 7) into which fits a gear shifting fork, 24 and 26, which forks are operatively connected with and adapted to operate the gears of a standard transmission, shown generally at 28, and which being conventional, need not be more fully described than to say that it provides for four speeds, three forward and a reverse, together with a neutral position. Forks 24 and 26 are fixed to slip rods 18 and 20 by any conventional means, such as bolts 30, or otherwise.

Provision is made at one end of the slip rods for moving the same by means of conventional driving cylinders of any preferred design. For this purpose, the slip rods are notched on their upper surface, as shown at 32, (see Fig. 7). Into this notch fits one arm of a lever, 34, (Fig. 1), pivoted at 36, and connected at its outer end by a link 38 with the piston rod 40. This piston rod 40 is directly connected to the pistons in the gear shifting cylinders, not shown. By this means the slip rods can be moved longitudinally to any one of the three positions; that shown in Fig. 1 being neutral position; in Fig. 4 one slip rod, 18, has been moved to the extreme left; the other rod, 20 being thereby locked in neutral position by a mechanism that will be presently described. In the third position, not shown, the slip rod 18 would be moved similarly to the extreme right.

Mounted on the block 10 are three aligned blocks 42, 44 and 46'. These blocks are just wide enough to fit snugly between slip rods 18 and 20, and assist in spacing same. Blocks 42 and 44 abut along their upper faces against cover plate 14.

Blocks 42 and 44 are spaced apart just a sufficient distance to hold my improved drift and clutch lock. This lock comprises four parts, two plates 46 and 48, (Fig. 8) of general L-shape, a deep semi-cylindrical groove 50 being cut into the flanged portion of each, normal to the horizontal surface. At the opposite end is a rounded projection, 52, having the general shape of a segment of a cylinder. Small cylinders, 54 of the same radius as the grooves 50 fit therein, being flush therewith on the horizontal surfaces, and projecting beyond said groove, outwardly.

In assembling the block, the two L-shaped members are placed together with the flange of one adjacent the inner face of the other, as shown in Fig. 8. A hole 56 is thereby formed, the use of which will appear later.

On the inner faces of the slip rods are formed grooves, of semi-cylindrical shape, and disposed as follows: grooves 58, 60 transverse the vertical inner opposed faces of rods 18 and 20 respectively. These grooves are so positioned that, when the slip rods are in the position corresponding to neutral of the gears, the grooves will be positioned exactly midway between blocks 42 and 44 (Fig. 1). Two other grooves 62 and 64 are cut in the same face of slip rod 18, their position being determined that one will be midway between blocks 42 and 44 when the slip rod is moved to bring either of its two gear shifts into operative position. These two grooves extend only part way along the face, as shown in Fig. 7, their vertical depth being exactly the same as the length of the groove 50 in element 46, (Fig. 8), and consequently, of a size corresponding to the cylinder 54. The relative shapes of grooves 50, 58, 62 and 64 are such that they are all exactly fitted or matched by cylinder 54 or projection 52; in other words, the radii of curvature of all the surfaces involved are exactly the same.

The relative lateral dimensions of the lock are such that the distance measured from the outermost tip of projection 52 to the outermost point of cylinder 54 is exactly the same as the distance from the plane surface defining the flat inner face of one slip rod to the extreme inner point of a groove in the other slip rod. Or in other words, if the assembly shown in Fig. 1 were moved laterally until the cylinder 54 fits snugly into its adjacent groove, and the L-shaped member abutted against the said cylinder, then the extreme outer point of projection 52 would barely contact with the flat wall of the other slip rod, projection 52 not entering to the least extent into groove 58.

It is to be noted (Fig. 7) that slip rods 18 and 20 are similarly grooved, except that the short grooves in rod 18 are below, while on rod 20 grooves 66 and 68 are above. Correspondingly on the lock mechanism (Fig. 8) it is to be noted that one cylinder will be in a groove on top (to the left on the figure) and the other cylinder will be below. In assembling, care is taken to place the cylinder adjacent the short grooves. For example, in Figs. 7 and 8, if the cylinders were inserted in grooves 50, then the end of the lock (Fig. 8) which extends to the left, would be so inserted in place that this end would be adjacent slip rod 20 (Fig. 7) in order that the cylinders could register with their corresponding short grooves. If the assembly were incorrectly made, obviously the cylinders could register only with the long grooves 58 and 60, which would defeat the purpose of the lock.

Sufficient structure has now been described to explain the action of the automatic drift lock, which operates as follows:—Starting with the gears and drift rods in neutral position, let us assume that it is desired to produce that shifting of the gears which is represented by sliding shift rod 18 to its extreme left position, the latter position being illustrated in Fig. 4. Obviously then the upper cylinder 54 will be pushed into the central or neutral groove in rod 20. Projection 52 on the upper element 46 of the lock will abut against the inner face of rod 18, and will prevent cylinder 54 from being moved out of groove 60, into which it is now firmly seated. The effect of this, obviously, will be to prevent any sliding of slip rod 20; in other words, slip rod 20, and the gears controlled by it are locked in neutral position, as long as slip rod 18 is in any position other than neutral. The same analysis would, of course, hold if slip rod 18 had been moved to the right instead of to the left, to control the gear shift corresponding to that position.

From this, therefore, it can be seen that, as long as slip rod 18 is out of neutral position, it is impossible to move slip rod 20, since it is locked by cylinder 54 and element 46, which latter is immobilized laterally by the fixed blocks 42 and 44.

A similar line of reasoning will show that if starting from neutral as shown in Fig. 1, slip rod 20 is moved to shift its associated gears, then slip rod 18 will be locked. In such an event, projection 52 will enter groove 58, cylinder 54 will abut against the inner smooth face of moving slip rod 20, and slip rod 18 will be immobilized.

So far I have described only the drifting action of lock element 46 (Fig. 8), and its associated cylinder, nothing having as yet been said concerning element 48 and its cylinder. The action in the latter case is, however, essentially the same. When acting as a drift lock, as described above, the two segments operate practically as a unit, the cylinder 54 and projection 52 on one side of the assembly both entering the same neutral groove, 58 or 60 as the case may be, and cooperating and reinforcing one another in immobilizing one slip rod while the other is in use.

While the mechanism heretofore described is effective for the described purpose, it can be seen that it can be improved, as follows:

Whenever one slip rod, as described above is moved to operating position, the other is locked until the first rod is returned to neutral, thus avoiding any possibility of meshing two gears of different ratios at one time. But the rod which is in operative position, it will be seen, can be moved at any time, there being no locking mechanism whatever working upon it. But, before a gear is shifted, it is absolutely essential that the clutch of the car be disengaged to avoid stripping the gears, or chipping the teeth thereof. Accordingly, I have so modified my drift lock that, in addition to the function described above, it will lock all gears in whatever position they may be, and will permit shifting only when the clutch is disengaged.

As shown best in Figs. 1 and 4, I mount in blocks 42, 44 and 46, centrally thereof, a bolt or "dagger" 70. This bolt passes centrally through aperture 56 (Fig. 8) of the lock mechanism. Rotation of the bolt is prevented by a pin 71 and a slot 73 (Fig. 4).

A collar 72 fixedly mounted on bolt 70 is adapted to abut against block 44, thus limiting the inward movement of the bolt. A coil spring 74 surrounds the bolt and abuts against the collar and against block 46, thus tending to keep the bolt or dagger as far in as the collar will permit.

Means for withdrawing the bolt against the pressure of spring 74 comprises a lever 76, pivoted at 78, with a head 80 pressing outwardly against the collar 72. A link 82 connects the outer arm of lever 76 with a connecting rod, 84 which is connected in any convenient manner with the lever 86 of the clutch pedal.

The bolt is thus withdrawn as follows:

When the clutch pedal is depressed, the lever 86 pulls on the connecting rod 84, swinging the lower arm of lever 76 to the left, or clock-wise on Fig. 1. Head 80 on the other or upper end of lever 76 bears against collar 72, pushing it and the associated bolt to the right, against the tension of the spring 74. When the clutch pedal is released, spring 74 pushes the bolt to the left again.

This action of the clutch pedal is made to lock and unlock the slip rods 18 and 20 as follows:

Bolt 70, as has been previously stated, passes horizontally through the space 56 defined between elements 46 and 48 of the lock, (Figs. 1, 4, and 8). The portions of the bolt which occupy this space are squared to fit neatly into said space, and the bolt is tapered in a horizontal plane, the narrowest portion being at the left end (Fig. 1). This bolt is therefore in reality nothing more or less than a wedge. Its horizontal dimensions are such that when spring 78 is pushing the bolt to its full extent leftward, the cylinder 54 on the lock mechanism will enter one of its associated grooves, and will be held in this groove by the wedge action of the bolt pressing against the L-shaped flange of member 46 or 48.

Conversely, when the bolt 70 is moved to the right against the tension of spring 74, its wedge action will no longer be exerted. If then an attempt is made to move either slip rod 18 or 20, the corresponding cylinder will be pushed out, the corresponding projection 52 will enter its groove, and the opposite rod will be locked by the drift lock action of my invention.

After a gear has been shifted by moving the appropriate slip rod, then, when the clutch is released, the slip rods will be locked in their new adjusted position. For the bolt, under influence of spring 74, will resume its role of wedge, and will push the cylinder adjacent the notch, 62, 64, 66, or 68 (Fig. 7), corresponding to the gear selected, into engagement with that notch, and the bolt will further maintain this engagement until the clutch is once more disengaged and the wedge removed.

The complete operation of my combined locks will now be apparent. Starting with the gears in neutral position (Figs. 1 and 7), with the clutch engaged, we find the bolt 70 acting as a wedge to force elements 46 and 48 and their associated cylinders outward. Consequently the cylinders will enter grooves 58 and 60. There is no possibilty of moving either slip rods while so locked.

Before attempting to shift gears, the clutch is depressed, moving lever 76, pushing collar 72 to the right, and withdrawing the beveled edges of the bolt from contact with the lock 46, 48. Elements 46 and 48 are now free to slide laterally, that is, vertically as shown in Fig. 1.

For convenience in illustrating, let us now assume that the shift shown in Fig. 4 is made. Then the upper cylinder will enter groove 60 (Fig. 7), and will immobilize rod 20. This is the action of the drift lock, as previously described. Slip rod 18 is still free to move.

Now, when the clutch pedal is let go, bolt 70 will move between elements 46 and 48, as a wedge, pushing them outward. The cylinder associated with element 48 will be pushed outward and into groove 64 (Fig. 7). Both slip rods are then completely immobilized, and the gears cannot be shifted until the clutch is depressed, when element 48 will be free to move inward, permitting cylinder 64 to be ejected from groove 64 by tangential pressure thereon, and rod 18 is free to move, rod 20 still being locked by drift lock.

It will thus be seen that I have produced an exceedingly compact and efficient combined drift and clutch lock, with a minimum of parts, and a lock which will protect the gears of a pneumatic gear shift car from accidental abuse, such as meshing two gears at once, or releasing a gear while the clutch is engaged, thus subjecting the teeth to an unnatural, and probably injurious strain.

An added advantage of my lock is that it permits "pre-selection" on a pneumatic gear shift car. Thus, assuming that the bolt 70 were completely removed from the assembly, whenever the air control levers were moved to produce a given shift, instantly the slip rods would begin to move and the gears to shift. Obviously then to avoid stripping of gears, it would be absolutely essential that, before setting the air valve, the clutch should be disengaged.

Naturally, of course, it requires a little time to build up a vacuum in the shifting cylinders, and this building up process would have to take place while the clutch was disengaged. A considerable loss of power would result in shifting gears on a hill. In heavy traffic a car would show a decided tendency to "drift." In my arrangement, however, this is entirely avoided. The vacuum valve may be set at any time, and the vacuum allowed to build up. Then, when the gear is needed, the clutch is released and instantly reengaged, and in the interval the slip rods have snapped into place.

As an added convenience, I have so modified the slip rods 18 and 20 that they may be operated manually, if the vacuum system should fail. This is best illustrated in Figs. 1 and 7, and the application in Fig. 9. On the inner end of each slip rod is fixed, by screws 88 or otherwise, a U shaped plate, having inwardly projecting prongs 92. On the floorboard 94 of the car is a socket element 96, designed to receive and removably hold an ordinary gear shifting lever 98. The lower end 100 of this lever is adapted to fit between the prongs 92 on the slip rods, and to engage therewith, whereby the slip rods may be moved, to shift the gears. This is an emergency measure, and when not in use, the lever 98 may be removed and stored in any convenient place. Before shifting the gears, it is of course necessary to release the clutch, as otherwise the slip rods cannot be moved.

While I have disclosed a particular and preferred embodiment of my invention, it is not to be understood that I limit myself strictly thereto. Many changes could be made by those skilled in the art, which changes are to be considered as covered by my invention. For example, instead of using cylinders 54, I might, if desired, dispense therewith, and form projections similar to the projections 52 on the other end of the elements. To lower friction, however, and for other reasons, I prefer the form described. Other changes, however, might be made, and are included in this invention, which is to be considered as limited only by the prior art and the appended claims.

I claim:

1. In an apparatus of the class described, means for shifting the gears of a car comprising two separately movable elements, each element having positions corresponding to neutral and two gear engagements, a combination lock comprising means for selectively engaging either shifting element and immobilizing it while permitting free movement of the other shifting element and means on said lock for engaging and immobilizing said other shifting element when the gears controlled thereby are in mesh.

2. In an apparatus of the class described, means for shifting the gears of a car, comprising two separately movable shifting elements, a lock comprising means for automatically engaging and immobilizing one shifting element in neutral position when the other element is moved from its neutral position, and means controlled by the operator for engaging and locking said moved element in any desired operating position.

3. In an apparatus of the class described, means for shifting the gears of a car comprising two separately movable shifting elements, a lock comprising two slidable locking elements, each locking element adapted automatically to engage and immobilize one shifting element in neutral position when the second shifting element is moved from its neutral position, and means under control of the operator for engaging the other locking element and moving it into locking engagement with said second shifting element.

4. In an apparatus of the class described, means for shifting the gears of a car comprising two separately movable shifting elements mounted in fixedly spaced relation, grooves in the adjacent faces of said shifting elements, a lock comprising two slidable locking elements, mounted between said shifting elements, each shifting element contacting with a locking element in a manner to push it partly into a groove in the opposite shifting element when the first shifting element is moved from neutral position, and means for pushing the second locking element partly into any of the grooves in the first shifting element at the will of the operator.

5. In an apparatus of the class described, means for shifting the gears of a car comprising two separately movable shifting elements mounted in fixedly spaced relation, grooves in the adjacent faces of said shifting elements, a lock comprising two slidable locking elements mounted between said shifting elements, each shifting element contacting with a locking element in a manner to push it partly into a groove in the opposite shifting element, in locking engagement therewith when the first shifting element is moved from neutral position and means for pushing the second locking element into any of the grooves of the first shifting element, comprising a projection on each locking element and a wedge passing between said projections and tending to push said elements apart.

6. In an apparatus of the class described, a lock for the slip rods of a pneumatic gear shift comprising two elements slidably mounted between the slip rods, means on said lock elements defining projections adapted to enter grooves in said slip rods, either slip rod when moved from its neutral position forcing one locking element into the groove of the other slip rod, and into locking engagement therewith, as long as said first slip rod is out of its neutral position, a wedge disposed between said locking elements and adapted to force the second locking element into engagement with an auxiliary groove on the slip rod which has been moved, and means controlled by the clutch pedal for forcing said wedge between said locking elements, and for withdrawing it when said clutch pedal is depressed.

7. In an apparatus of the class described a lock for the slip rods of a pneumatic gear shift comprising two elements slidably mounted between the slip rods, means on each of said lock elements defining two projections, one of said projections comprising a cylinder mounted in a semicircular notch in the edge of the lock element, the other projection comprising an integral semicircular tongue, said projections being adapted to enter grooves in said slip rods, either slip rod when moved from its neutral position forcing one locking element into the groove of the other slip rod, and into locking engagement therewith, as long as said first slip rod is out of its neutral position, a wedge disposed between said locking elements and adapted to force the second locking element into engagement with an auxiliary groove on the slip rod which has been moved, means controlled by the clutch pedal for withdrawing said wedge when the pedal is depressed, and means for inserting the wedge when the pedal is released.

8. A lock for a pneumatic gear shift apparatus, comprising two locking elements mounted to drift between the slip rods of the gear shift, each locking element having projections adapted to engage with depressions in the slip rods, one of said locking elements being held in locking contact with one slip rod by sliding contact with the other slip rod, and means for bringing the other lock element in locking engagement with the second slip rod, and means for controlling said second locking element at the will of the driver.

9. A lock for a pneumatic gear shift apparatus comprising two locking elements mounted to drift between the slip rods of the gear shift, each locking element having projections adapted to engage in locking relationship with depressions in the slip rods, one of said locking elements being held in locking contact with one slip rod by sliding contact with the other slip rod, as long as said other slip rod is out of its neutral position, means for bringing the other lock element in locking engagement with the second slip rod, said means comprising a wedge fitting between said locking elements, and a spring pressing said wedge against said locking elements.

10. A lock for a pneumatic gear shift apparatus comprising two locking elements mounted to drift between the slip rods of the gear shift, each locking element having projections adapted to engage in locking relationship with depressions in said slip rods, one of said locking elements being held in locking contact with one slip rod by sliding contact with the second slip rod, as long as said second slip rod is out of its neutral position, means for bringing the second locking element in locking engagement with the second slip rod, said means comprising a wedge fitting between said locking elements, a spring pressing said wedge against said locking elements.

11. A lock for a pneumatic gear shift apparatus comprising two locking elements mounted to drift between the slip rods of the gear shift, each locking element having projections adapted to engage in locking relationship with depressions in said slip rods, one of said locking elements being held in locking contact with one slip rod by sliding contact with the second slip rod, as long as said second slip rod is out of its neutral position, means for bringing the second locking element in locking engagement with the second slip rod, said means comprising a wedge fitting between said locking elements, a spring pressing said wedge against said locking elements and a lever adapted to push the wedge out of contact with said locking elements and against said spring.

12. A lock for a pneumatic gear shift apparatus comprising two locking elements mounted to drift between the slip rods of the gear shift, each locking element having projections adapted to engage in locking relationship with depressions in said slip rods, one of said locking elements being held in locking contact with one slip rod by sliding contact with the second slip rod, as long as said second slip rod is out of its neutral position, means for bringing the second locking element in locking engagement with the second slip rod, said means comprising a wedge fitting between said locking elements, a spring pressing said wedge against said locking elements, and a lever adapted to push the wedge out of contact with said locking elements against the tension of said spring and means connected with the clutch pedal for operating said lever.

13. A lock for the slip rods of a pneumatic gear shift comprising a pair of locking elements mounted adjacent the slip rods, each element engageable with one rod in a locking relation, said element acting as a clutch controlled lock when its slip rod is moved, and as a drift lock as long as the other slip rod is moved from its neutral position.

In testimony whereof, I have signed my name to this specification this May 4th day of 1928.

ALBERT A. HODGKINS.